US011895308B2

(12) United States Patent
Lakshmanan et al.

(10) Patent No.: US 11,895,308 B2
(45) Date of Patent: Feb. 6, 2024

(54) VIDEO ENCODING AND DECODING SYSTEM USING CONTEXTUAL VIDEO LEARNING

(71) Applicant: Portly, Inc., Lafayette, CO (US)

(72) Inventors: Balaji Lakshmanan, Rancho Palos Verdes, CA (US); Theodore F. Heieck, Lafayette, CO (US)

(73) Assignee: Portly, INC., Lafayette, CO (US)

( * ) Notice: Subject to any disclaimer, the term of this patent is extended or adjusted under 35 U.S.C. 154(b) by 0 days.

(21) Appl. No.: 17/336,235

(22) Filed: Jun. 1, 2021

(65) Prior Publication Data

US 2021/0377548 A1 Dec. 2, 2021

Related U.S. Application Data

(60) Provisional application No. 63/033,653, filed on Jun. 2, 2020.

(51) Int. Cl.
*H04N 19/20* (2014.01)
*H04N 19/17* (2014.01)
*H04N 19/37* (2014.01)

(52) U.S. Cl.
CPC ............. *H04N 19/20* (2014.11); *H04N 19/17* (2014.11); *H04N 19/37* (2014.11)

(58) Field of Classification Search
CPC ...................................................... H04N 19/20
USPC ...................................................... 375/240.08
See application file for complete search history.

(56) References Cited

U.S. PATENT DOCUMENTS

| 10,264,211 | B2* | 4/2019 | Leech | H04N 19/137 |
| 2004/0022322 | A1* | 2/2004 | Dye | H04N 19/37 |
| | | | | 375/240.26 |
| 2015/0131921 | A1* | 5/2015 | Huang | H04N 19/23 |
| | | | | 382/233 |
| 2016/0173882 | A1* | 6/2016 | Mishra | H04N 19/426 |
| | | | | 375/240.08 |
| 2020/0099954 | A1* | 3/2020 | Hemmer | H04N 19/593 |

* cited by examiner

*Primary Examiner* — Ayman A Abaza
(74) *Attorney, Agent, or Firm* — ALONZO & ASSOCIATES; Arlyn Alonzo (57) ABSTRACT

Aspects of the disclosure are directed to a video system. In one aspect, a video encoding/decoding method or apparatus includes segmenting each frame of a sequence of raw image frames to derive objects of interest; ranking the objects of interest to generate a ranks and ranked objects of interest; generating frame keys corresponding to the objects of interest; retrieving a source stored model data; and generating a training metric using the frame keys and the source stored model data. In another aspect, it includes receiving frame keys from a source portion; retrieving a destination stored model data and sending the destination stored model data to a destination contextual video learning system; and retrieving objects of interest from the destination stored model data using the frame keys and the destination contextual video learning system.

18 Claims, 4 Drawing Sheets

VIDEO ENCODING AND DECODING SYSTEM USING CONTEXTUAL VIDEO LEARNING

CLAIM OF PRIORITY UNDER 35 U.S.C. § 119

The present application for patent claims priority to Provisional Application No. 63/033,653 entitled "Video Encoding System Using Contextual Video Learning" filed Jun. 2, 2020, and assigned to the assignee hereof and hereby expressly incorporated by reference herein.

TECHNICAL FIELD

This disclosure relates generally to the field of video encoding and decoding, and in particular, to a video encoding and decoding system using contextual video learning.

BACKGROUND

Raw video information (i.e., uncompressed video) requires a high data rate stream for real-time transport. Depending on image fidelity requirements, raw video data rates range from approximately 100 Megabits per second (Mbps) for standard resolution video to greater than 1000 Mbps for high-definition video. Since bandwidth and computational processing load are both proportional to data rate for a given modulation and transmission scheme, raw video information consumes significant bandwidth and computational resources in many systems. Video encoding techniques (i.e., video compression) may be used to reduce (i.e., compress) the video data rate to alleviate bandwidth and computational resource demands. However, typical video encoding techniques do not incorporate contextual video learning to reduce the video data rate further.

SUMMARY

The following presents a simplified summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a video encoding/decoding system. Accordingly, a method for video encoding including segmenting each frame of a sequence of raw image frames to derive a plurality of objects of interest; ranking the plurality of objects of interest to generate a plurality of ranks and a plurality of ranked objects of interest; generating a plurality of frame keys corresponding to the plurality of objects of interest; retrieving a source stored model data; and generating a training metric using the plurality of frame keys and the source stored model data.

In one example, the method further includes testing the training metric by comparing the training metric to a metric based on the sequence of raw image frames. In one example, the method further includes transporting the plurality of frame keys over a communication path if the training metric passes a loss metric test. In one example, the method further includes transporting a sequence of encoded image frames over the communication path if the training metric fails the loss metric test.

In one example, the method further includes acquiring the sequence of raw image frames. In one example, a camera is configured to acquire the sequence of raw image frames. In one example, the method further includes acquiring an audio signal associated with the sequence of raw image frames. In one example, a microphone is configured to acquire the audio signal. In one example, the method further includes generating the sequence of encoded image frames from the sequence of raw image frames.

Another aspect of the disclosure provides a method for video decoding includes receiving a plurality of frame keys from a source portion by a destination contextual video learning system; retrieving a destination stored model data from a storage system and sending the destination stored model data to the destination contextual video learning system; and retrieving a plurality of objects of interest from the destination stored model data using the plurality of frame keys and using the destination contextual video learning system.

In one example, the method further includes reconstructing a plurality of image segments from the plurality of objects of interest using a destination contextual image segmenter. In one example, the method further includes ranking the plurality of objects of interest to generate a plurality of retrieved ranks and a plurality of retrieved ranked objects of interest using a destination ranking system. In one example, the method further includes rendering a sequence of reconstructed image frames using the plurality of retrieved ranks and the plurality of retrieved ranked objects of interest. In one example, an image renderer is configured to render the sequence of reconstructed image frames. In one example, the method further includes decoding a sequence of encoded image frames to generate a sequence of decoded image frames.

Another aspect of the disclosure provides an apparatus for video encoding including a source contextual image segmenter configured to segment each frame of a sequence of raw image frames to derive a plurality of objects of interest; a source ranking system coupled to the source contextual image segmenter, the source ranking system configured to rank the plurality of objects of interest to generate a plurality of ranks and a plurality of ranked objects of interest; a frame key generator coupled to the source contextual image segmenter, the frame key generator configured to generate a plurality of frame keys corresponding to the plurality of objects of interest; and a source contextual video learning system coupled to the frame key generator, the source contextual video learning system configured to generate a training metric using the plurality of frame keys and a source stored model data. In one example, the apparatus further includes a memory coupled to the source contextual video learning system, the memory configured to store the source stored model data.

Another aspect of the disclosure provides an apparatus for video decoding including a destination contextual video learning system configured to receive a plurality of frame keys from a source portion; and a storage system coupled to the destination contextual video learning system, the storage system configured to store a destination stored model data and to send the destination stored model data to the destination contextual video learning system; and wherein the destination contextual video learning system is configured to retrieve a plurality of objects of interest from the destination stored model data using the plurality of frame keys.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, communication and storage systems transport (over space or over time) signals which represent information sources such as speech, audio, imagery, video, data, etc. For example, video is a common information source where two-dimensional spatial imagery over time is produced as a video signal (i.e., an information function) as a function of time. That is, although video is a three-dimensional information source with two spatial dimensions and one temporal dimension, the video signal may be produced as a one-dimensional function of time. For example, the video signal may include at least two components: luminosity and chroma. For example, luminosity is a measure of signal intensity or amplitude, independent of color content. For example, chroma is a measure of color content or hue. Chroma may be represented by a plurality of basis colors, for example, red (R), green (G), blue (B), which may be combined in varying proportions to produce any hue. That is, the video signal may be represented in a RGB color format.

The video signal may be transported from a source node to a destination node (or a plurality of destination nodes). In one example, the transport is over space (e.g., a communication system) where the source node and the destination node are spatially separated. In another example, the transport is over time (e.g., a storage system) where the source node and the destination node are temporally separated. That is, the transport of the video signal between the source node and the destination node may be performed by a communication system between two or more spatial locations or by a storage system between two or more temporal epochs. In one example, the video signal is presented (e.g., displayed) at the destination node.

For example, the transport or transmission of the video signal may be either a real-time transmission or a non-real-time transmission. In one example, transport delay is a time delay between production of the video signal at the source node and presentation of the video signal at the destination node. For example, real-time transmission is a transport of the video signal from the source node to the destination node (or nodes) with a transport delay predominately due to a finite propagation speed (i.e., an electromagnetic propagation speed c and a distance d result in a transport delay $T=c/d$). On the other hand, a non-real-time transmission is a transport of the video signal from the source node to the destination node (or nodes) with an arbitrarily large transport delay (e.g., a recorded video program).

In one example, at the source node, the video signal may be represented in a sampled form where time-varying spatial imagery is sampled in two spatial directions (e.g., horizontal and vertical dimensions) and sampled in time to produce a sampled video signal. In addition, the sampled video signal may be represented as a temporal sequence of two-dimensional image frames where its amplitude is quantized (i.e., restricted to a finite set of discrete data). That is, the sampled video signal may be represented as a finite set of discrete video data samples indexed by two spatial coordinates and one temporal coordinate. Alternately, the sampled video signal may be represented by a raw digital video signal (e.g., a plurality of discrete video data samples) as a function of time, where the two spatial coordinates and one temporal coordinate of the sampled video signal are mapped to a single time dimension (e.g., via a periodic raster scan). In one example, a raw digital video signal is a digital video signal which is uncompressed.

For example, each discrete video data sample may represent a single pixel (i.e., picture element) in an image. In one example, the raw digital video signal has a raw video data rate. For example, the raw video data rate is determined by a product of pixel dynamic range (in bits/pixel) and a pixel rate (in pixel/sec). For example, the pixel rate may be determined by a product of spatial resolution (in pixel/frame) and frame rate (in frame/sec). In one example, the raw video data rate may be expressed in bits/sec (bps). For example, the raw video data rate may be greater than 100 Mbps. In one example, for a raw digital video signal with 24 bits/pixel dynamic range, 640×480 pixel/frame spatial resolution, and 30 frame/sec frame rate, the raw video data rate is approximately 221 Megabits per second (Mbps).

In one example, the raw digital video signal may be further processed at the source node to reduce its video data rate prior to transport. For example, the raw digital video signal may be compressed by video encoding (i.e., source encoding) to produce a compressed digital video signal with a compressed video data rate. In one example, video encoding results in a compressed video data rate which is less than the raw video data rate. For example, the compressed video data rate may be less than 100 Mbps. In one example, a high-definition (HD) quality compressed digital video signal may have a compressed video data rate of approximately 10 Mbps.

In some examples, techniques for video encoding or source encoding include video encoding systems which process luminosity and chroma in the raw digital video signal and perform motion estimation without image recognition. In contrast, a contextual video encoding system which recognizes objects in the image and human activity (e.g., facial expressions, lip movement, etc.) as part of video encoding, transport and retrieval may include advantages.

In one example, a session is a communication or storage event which transports information from a source node to a destination node. For example, a session may be a transport of a compressed digital video signal over a defined time duration. For example, the session may correspond to a single television episode or a videoconference. In one example, a compressed digital video signal with a compressed video data rate of 10 Mbps transported over one hour time duration results in a session with approximately 36,000 Mbits (i.e., 36 Gbits or 4.5 Gbytes) transported for the compressed digital video signal (i.e., 10 Mbps×3600 sec).

In some examples, video encoding systems for real-time transmission do not exploit long-term memory. That is, the video encoding system does not retain video information from a previous session for a subsequent session. A contextual video encoding system which retains video information from previous video transmission sessions has advantages over video encoding systems that do not retain video information. For example, the contextual video encoding system may contribute to an improved video transmission experience by reducing bandwidth and computational resource demands.

In one example, a quantized sampled digital video signal includes a temporal sequence of two-dimensional raw image frames or as a sequence of raw image frames. For example, each image frame is indexed by two spatial coordinates (e.g., horizontal and vertical coordinates). For example, the image frames may be decomposed (i.e., separated into constituents) into individual video objects using image segmentation. For example, the image segmentation may be performed by a segment processor. For example, the individual video objects may be identified to produce identified video objects. For example, the identification may be performed by an identification processor.

In one example, the identified video objects may be ranked by a ranking algorithm to produce ranked video objects. For example, the ranking may be performed by a ranking processor. In one example, the ranking algorithm determines an order of importance for the ranked video objects. For example, the ranking algorithm produces a rank value which is an integer. For example, a rank value of 1 may indicate the most important ranked video object, a rank value of 2 may indicate the second most important ranked video object, etc. The ranked video objects may be stored with varying quality measures based on the order of importance, for example, based on the ranked value.

In one example, the storage may be performed by a memory unit or a storage system. For example, a higher ranking implies a higher order of importance. For example, a lower ranking implies a lower order of importance. For example, a higher ranking video object may be stored in memory with a higher quality metric. For example, a higher quality metric may be improved spatial resolution (i.e., more pixels per frame), higher frame rate (i.e., more frames per second), improved dynamic range (i.e., more bits/pixel), etc., relative to a lower ranking video object. One skilled in the art would understand that other examples of higher quality metric, not disclosed herein, are also within the scope and spirit of the present disclosure.

In one example, there are two types of video encoding systems: lossless and lossy. For example, a lossless video encoding system produces a compressed digital video signal which does not lose information relative to the raw digital video signal (i.e., the video encoding is reversible, or information entropy is conserved). For example, a lossy video encoding system produces a compressed digital video signal which loses information relative to the raw digital video signal (i.e., the video encoding is irreversible, or information entropy is reduced). In general, a lossy video encoding system may have a significant advantage over a lossless video encoding system due to a greatly reduced compressed video data rate. That is, the lossy video encoding system may greatly reduce bandwidth and computational resource demands.

In one example, the lossy video encoding system produces a compressed digital video signal with a reduction of resolution in sampling rate, color representation, pixel density (e.g., spatial resolution), etc. For example, a definition of lossy video encoding may be extended to other attributes, such as object features. For example, object features may include shape, color, dimension, etc. In another example, the lossy video encoding system produces a compressed digital video signal with a loss of object features. For example, a loss of object features may be an image of a person with high spatial resolution but a change in color of clothing (e.g., a shirt), a change of color of hair or eyes, etc.

In one example, stored objects in a stored image may be recalled in a lossy manner by using a frame key. For example, a frame key may be an index to an important object feature related to the stored image such as a smile or facial expression for an image frame. In one example, the frame key may be transmitted at a lower bandwidth and used as an object locator to recall a lossy version of a high-resolution image. In another example, the frame key may be a voice input or other forms of input to recall the stored image.

In one example, individual video objects of a desired rank may be retrieved from a storage system to be stitched onto an image canvas to create a virtual frame of video objects. In one example, an image canvas is a formatted platform for storing video objects. For example, an image of a person may be retrieved by a retrieval system from the storage system and stitched to a virtual background to create a virtual frame. For example, the virtual background may be an image of a beach, a conference room, etc. In one example, the virtual frame may be used for virtual locations and virtual environments for retrieved image frames.

In one example, a sequence of retrieved image frames may form an animation of recalled images. In one example, the animation is a sequence of image frames displayed as a function of time. In one example, the animation may create an environment where the storage system and the retrieval system learn to animate the same recalled images using voice or other forms of frame key (e.g., lip movement). For example, the same recalled image may include recalled facial expressions of a person over time.

In one example, the contextual video encoding system has a capability to decompose video objects according to a ranking system and learn over time to recall those video objects using frame keys.

In one example, raw image frames may include a plurality of objects. For example, the raw image frames may be segmented (i.e., decomposed) to obtain a plurality of objects of interest or objects which have some importance to the user. In one example, the plurality of objects of interest may be ranked (i.e., prioritized by importance) to generate a plurality of ranked objects of interest. In one example, a raw image frame may include an image of a human which may be segmented into a face, limbs, torso, etc. and an image of background artifacts which may be segmented into books, bookshelf, wall photos. That is, in this example, objects of interest may be a plurality of human body parts and a subset of the background artifacts (e.g., wall photos). For example, another subset of the background artifacts (e.g., books, bookshelf, etc.) may not be objects of interest. In one example, objects which are not objects of interest may not be transmitted and may be instead replaced at the destination with either stock images or prior collected images of the same.

In one example, the plurality of ranked objects of interest may be generated from the plurality of objects of interest by a ranking algorithm. For example, the plurality of objects of interest may be ranked as they appear over different sessions or over time. For example, one of the plurality of objects of interest (e.g., wall photos) may be ranked lower at a first time interval t1 than at a second time interval t2. For example, one instance of the plurality of objects of interest may be ranked higher at third time interval t3 than at a fourth time interval t4 on the basis of higher spatial resolution or visual brightness so that the one instance is selected for display for improved visual quality (e.g., over a duller, darker image from a different time interval).

In one example, video encoding and decoding systems have focused on technical image parameters such as hue, contrast, saturation, etc., but do not consider content or context of image stream itself. For example, deciphering the context and meaning of the image stream is left to the viewer. Instead, a common goal has been to develop video encoding and decoding systems which faithfully reconstruct a near perfect replica of the original source content from the compressed video signal. For example, a contextual video encoding system recognizes that the image stream is not just a collection of arbitrary colors, bit depths, etc., but is a collection of elements in a space that is intended to convey a meaning.

For example, an initial step in the contextual video encoding system is the identification of objects of interest, that is, the elements which are important in the image stream based on criteria such as source application or service, video environment, simultaneous audio which gives clues to important elements, business or regulatory rules or requirements, etc. In one example, the transport method and ultimate destination factors, such as application, environment, etc. may impact the determination of which elements are selected as objects of interest.

For example, once objects of interest are identified, the objects may be ranked, tiered, weighted, i.e., sorted into a hierarchy of importance. In one example, the ranking or sorting may be performed in multiple aspects, e.g., comparing the objects of interest with each other to determine relative importance. For example, in a videoconference, a human face, lips, hands or body may be more important than a bookshelf in the background. In another example, the ranking or sorting may depend on a context of time. For example, an image of a first human in which the contextual encoding system has recognized from past sessions may have a different ranking than an image of a second human in which the contextual video encoding system has no previous recognition. For example, the ranking may depend by source, transport or destination factors as well.

In one example, the contextual video encoding system includes a learning process with a learning system to perform contextual video encoding. For example, a raw image frame may be segmented to generate an object matrix O with a type matrix T. In one example, a Euclidean distance matrix E which includes Euclidean distances between pairs of objects is computed by the ranking system. For example, the object matrix O are weighted by the ranking system to generate a ranked object matrix R. For example, the ranking system generates a rank-adjusted frame key matrix K by performing a matrix multiplication between the Euclidean distance matrix E and the ranked object matrix R, that is, K=E*R, where * denotes matrix multiplication.

In one example, the learning system accepts the type matrix T, the rank-adjusted frame key matrix K and the set of raw image frames to learn how to recall ranked objects using the rank-adjusted frame key matrix K. In one example, the learning system uses a neural network, for example, a graph neural network to learn how to recall ranked objects using the rank-adjusted frame key matrix K.

After the learning process is completed, a retrieval process is used for contextual video encoding and decoding. For example, for each acquired raw image frame from a camera, a rank-adjusted frame key input matrix I is derived and presented to a contextual learning system to recall an object to generate a recalled object. Next, a difference between the recalled object and original object may be computed. For example, the retrieval process may compute a second rank-adjusted frame key matrix C from the recalled object. For example, a matrix distance D may be computed as a difference between the rank-adjusted frame key input matrix I and the second rank-adjusted frame key matrix C, that is D=I−C. In one example, establish a loss threshold L for a loss metric test. For example, compare the matrix distance D to the loss threshold L. If the matrix distance D is less than the loss threshold L, then the loss metric test passes. If the matrix distance D is greater than or equal to the loss threshold L, then the loss metric test fails. In one example, if the matrix distance D is zero, then the recalled object is the same as the original object and there is no loss.

Figure 1:
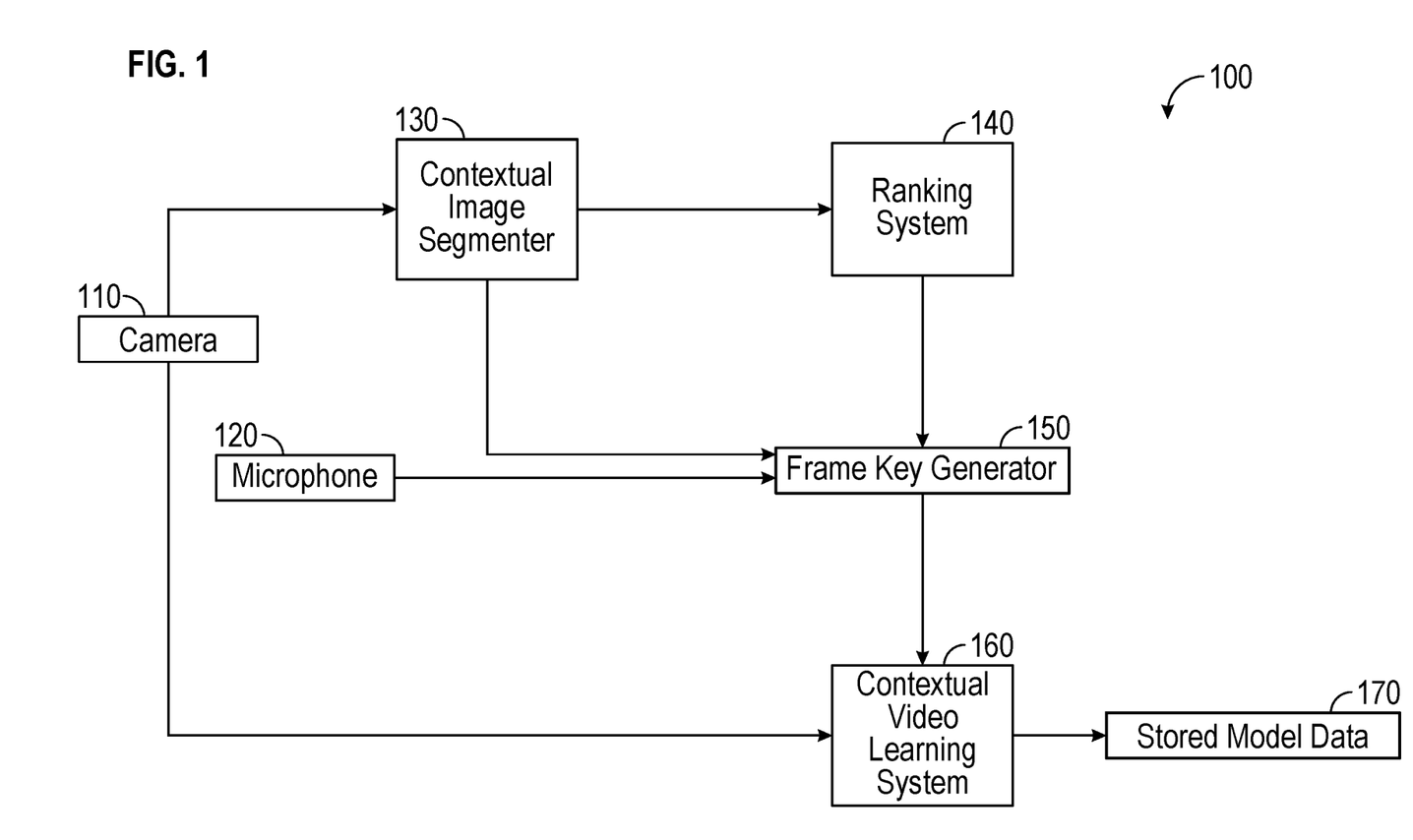
FIG. 1 illustrates an example of a contextual video encoding system learning process.
Figure 2:
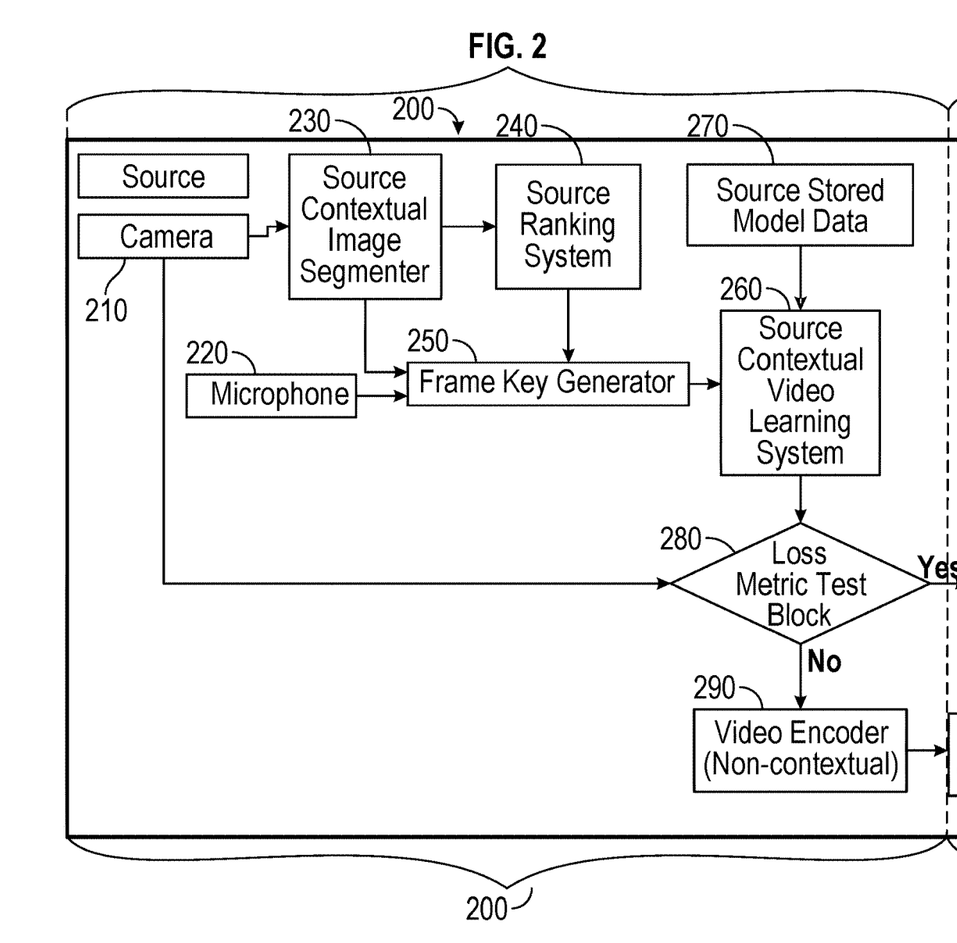
FIG. 2 illustrates an example of a contextual video encoding system retrieval process source portion.
Figure 3:
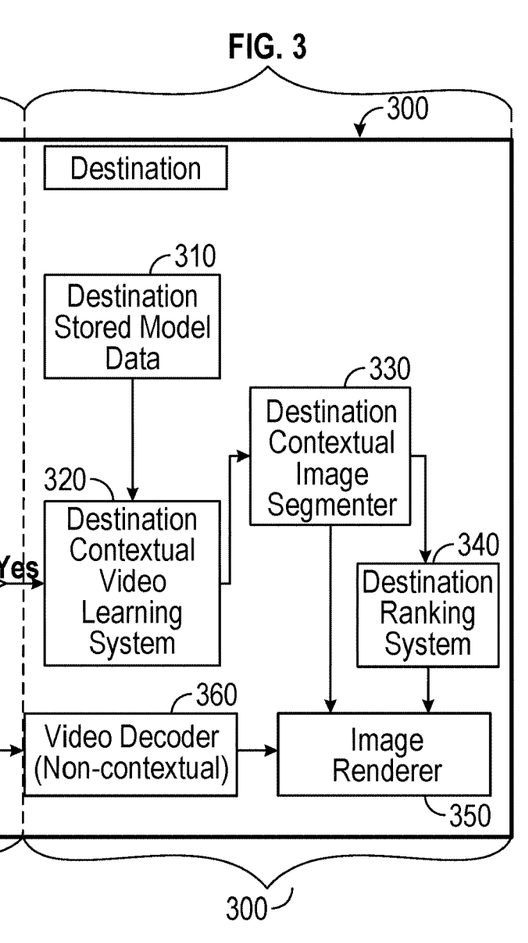
FIG. 3 illustrates an example of a contextual video encoding system retrieval process destination portion.

In one example, there are two processes associated with the contextual video encoding system: a learning process and a retrieval process. FIG. 1 illustrates an example of a contextual video encoding system learning process 100. FIG. 2 illustrates an example of a contextual video encoding system retrieval process source portion 200. FIG. 3 illustrates an example of a contextual video encoding system retrieval process destination portion 300. For example, the contextual video encoding system retrieval process source portion 200 may include a contextual video encoder and the contextual video encoding system retrieval process destination portion 300 may include a contextual video decoder.

In FIG. 1, block 110 is a camera for acquiring a video signal from a source as a temporal sequence of two-dimensional raw image frames. For example, the temporal sequence of two-dimensional raw image frames may be described as a sequence of raw image frames. In one example, the raw image frames may include a chroma component. For example, the chroma component may include a plurality of basis colors, for example, red (R), green (G), blue (B), which may be combined in varying proportions to produce any hue. That is, the video signal may be represented in a RGB color format. In one example, the camera captures multicolor (e.g., red/green/blue, RGB) image frames of a scene viewed by a lens (not shown). For example, the camera may also support depth perception.

In FIG. 1, block 120 is a microphone for acquiring an audio signal from the source. For example, the audio signal is associated with the video signal. In one example, the audio signal is monoaural audio. In one example, the audio signal is stereo audio. In one example, the audio signal is multi-channel audio (e.g., multiple languages). In one example, the audio signal is a voice input. In another example, the audio signal is a music input.

In FIG. 1, block 130 is a contextual image segmenter to produce segmented image frames with objects of interest from the acquired video signal (i.e., raw image frames). In one example, segmentation is a decomposition of an image frame to produce segmented image frames. In one example, the contextual image segmenter accepts acquired sequence of raw image frames and determines objects of interest using image segmentation. In one example, the contextual image segmenter recognizes humans in the sequence of raw image frames and detects activity such as facial or limb movement, etc.

In FIG. 1, block 140 is a ranking system for determining a rank value for the objects of interest in the segmented images. For example, the rank value is an integer. For example, a rank value of 1 may indicate a most important ranked video object, a rank value of 2 may indicate a second most important ranked video object, etc. In one example, the rank is determined based on a ranking algorithm.

In FIG. 1, block 150 is a frame key generator for generating a plurality of frame keys from the segmented images. In one example, the frame key generator accepts segmented images from the contextual image segmenter 130, rank and ranked objects of interest from the ranking system 140 and/or audio signal from the microphone 120 to generate the plurality of frame keys from segmented image frames. In another example, the frame key generator 150 may support textual representation of the objects of interest for the frame key.

In FIG. 1, block 160 is a contextual video learning system for producing a loss metric or loss factor. For example, the contextual video learning systems is a neural network. In one example, the loss metric is produced using the plurality of frame keys and the raw image frames. In one example, the loss metric is determined using an error metric. In one example, the error metric is a minimal output error.

In FIG. 1, block 170 is stored model data. In one example, the stored model data 170 is an output of the contextual video learning system 160.

FIG. 2 illustrates an example of a contextual video encoding system retrieval process source portion 200. In FIG. 2, block 210 is a camera for acquiring a sequence of raw image frames. In one example, the camera captures multicolor (e.g., red/green/blue, RGB) image frames of a scene viewed by a lens (not shown). For example, the camera may also support depth perception.

In FIG. 2, block 220 is a microphone for acquiring an audio signal. In one example, the audio signal is monoaural audio or stereo audio. Block 230 of FIG. 2 is a source contextual image segmenter to produce segmented image frames from the raw image frames. In one example, the source contextual image segmenter 230 accepts raw image frames and determines objects of interest in the segmented image frames using image segmentation. In one example, the source contextual image segmenter recognizes humans in the raw image frames and detects activity such as facial or limb movement, etc.

In FIG. 2, block 240 is a source ranking system for determining a rank for the objects of interest. In one example, the rank is determined based on a ranking algorithm. Block 250 of FIG. 2 is a frame key generator for generating a plurality of frame keys from segmented image frames. In one example, the frame key generator accepts segmented image frames from the source contextual image segmenter 230, rank and ranked objects of interest from the source ranking system 240 and/or audio signal from the microphone 220 to generate the plurality of frame keys from segmented image frames. In another example, the frame key generator 250 may support textual representation of the objects of interest for the plurality of frame keys.

In FIG. 2, block 260 is a source contextual video learning system for generating a training metric and source stored model data. In one example, the training metric is generated using the plurality of frame keys and the sequence of raw image frames. In one example, the training metric is determined using an error metric. In one example, the error metric is a minimal output error.

In FIG. 2, block 270 is source stored model data. In one example, the source stored model data is an input to the source contextual video learning system 260. Block 280 of FIG. 2 is a loss metric test block which determines, in one example, if loss is acceptable. In one example, the loss metric test block 280 transports the plurality of frame keys to the destination over a communication path.

In FIG. 2, block 290 is a video encoder. In one example, the video encoder complies with a commercially-available encoding standard such as MPEG-2, H.264, VP9, etc. In one example, the video encoder is a non-contextual video encoder.

FIG. 3 illustrates an example of a contextual video encoding system retrieval process destination portion 300. In FIG. 3, block 310 is a destination stored model data and block 320 is a destination contextual video learning system.

In FIG. 3, block 330 is a destination contextual image segmenter. In one example, the destination contextual image segmenter 330 accepts destination stored model data as input and produces objects of interest as output.

In FIG. 3, block 340 is a destination ranking system for determining a rank for the objects of interest. In one example, the rank is determined based on a ranking algorithm. In one example, the destination contextual video learning system 320 receives the plurality of frame keys from the loss metric test block 280 of FIG. 2.

Block 310 of FIG. 3 is the destination stored model data. In one example, the destination stored model data 310 is an input to the contextual video learning system 320. Block 360 of FIG. 3 is a video decoder. In one example, the video decoder 360 is matched to the video encoder 290 of FIG. 2 and generates a sequence of decoded image frames. In one example, the video decoder 360 complies with a commercially-available decoding standard such as MPEG-2, H.264, VP9, etc. In one example, the video decoder 360 is a non-contextual video decoder. In one example, the video encoder 290 is a non-contextual video encoder.

In FIG. 3, block 350 is an image renderer. In one example, the image renderer 350 receives rank from the destination ranking system 340 and objects of interest from the destination contextual image segmenter 330. In one example, the image renderer 350 receives the sequence of decoded image frames from the video decoder 360.

In one example, the contextual video learning system retrieval process source portion transforms a sequence of raw image (objects of interest) and stores a form of the sequence of raw image frames based on the plurality of frame keys generated by a combination of a source ranking system and source contextual image segmenter output. For example, the contextual video learning system retrieval process source portion may have the capability to recall segmented image frames (objects of interest) based on the plurality of frame keys. In one example, once the contextual video learning system has memorized the combinations of the plurality of frame keys to segmented image frames (a.k.a., objects of interest) (i.e., a learning dataset), it is presented with the plurality of frame keys generated from test segmented image frames (a.k.a., objects of interest) not previously presented and is asked to recall.

For example, the test segmented image frames may be images of a person that were previously presented in a learning dataset but in a different lighting environment, different clothing, different background, etc. For example, recalled segmented image frames are then compared to the test segmented image frames to determine a loss metric or loss factor. For example, lossy encoding implies loss of object features.

In one example, if the loss metric is below a preset threshold, then system training is complete for the objects of interest in the learning dataset. In the contextual video learning system retrieval process source portion, until the training is completed, the compressed digital video signal is transmitted via a video encoder (i.e., a non-contextual video encoder). Once the training is complete, the compressed digital video signal is augmented by using the plurality of frame keys for recalling the stored objects of interest.

Although particular examples of frame rates, spatial resolution (in pixel/frame), pixel dynamic ranges (in bits/pixel), pixel rates (in pixel/sec), data rates (in bits/sec), etc., are disclosed herein, one skilled in the art would understand that such examples are not exclusive and that other examples of these parameters are also within the scope and spirit of the present disclosure.

Figure 4:
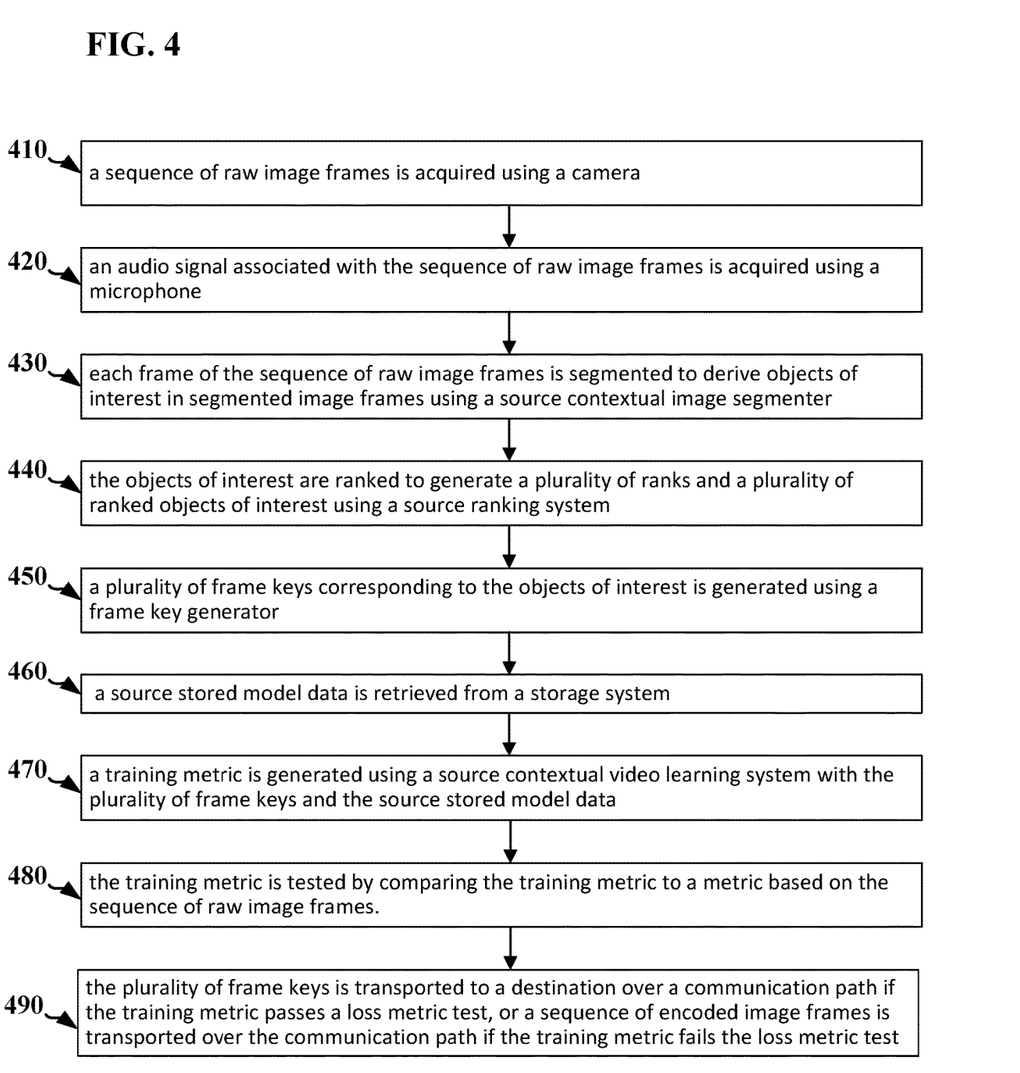
FIG. 4 illustrates an example flow diagram for a video encoding system using contextual video learning at a source portion.

FIG. 4 illustrates an example flow diagram 400 for a video encoding system using contextual video learning at a source portion. In block 410, a sequence of raw image frames is acquired using a camera (e.g., camera 210 shown in FIG. 2). In one example, the sequence of raw image frames is a sequence of red/green/blue (RGB) image frames. In one example, the sequence of raw image frames may be represented as a temporal sequence of two-dimensional image frames with quantized amplitude (i.e., restricted to a finite set of discrete data). That is, the sequence of raw image frames may be indexed by two spatial coordinates and one temporal coordinate. Alternately, the sequence of raw image frames may be indexed as a function of time, where the two spatial coordinates and one temporal coordinate are mapped to a single time dimension (e.g., via a periodic raster scan). In one example, the sequence of raw image frames is uncompressed. The sequence of raw image frames may be sent to a source contextual image segmenter (e.g., source contextual image segmenter 230) and to a loss metric test block (e.g., loss metric test block 280).

In block 420, an audio signal associated with the sequence of raw image frames is acquired using a microphone (e.g., microphone 220). For example, the audio signal may be monoaural audio, stereo audio or multichannel audio. For example, the audio signal is a voice or music input. The audio signal may be sent to a frame key generator (e.g., frame key generator 250).

In block 430, each frame of the sequence of raw image frames is segmented to derive a plurality of objects of interest in segmented image frames using a source contextual image segmenter (e.g., source contextual image segmenter 230). In one example, the source contextual image segmenter accepts the sequence of raw image frames and determines the plurality of objects of interest using image segmentation. For example, the plurality of objects of interest are segmented image frames. In one example, the source contextual image segmenter recognizes humans in the raw image frames and detects activity such as facial or limb movement, etc. The source contextual image segmenter may send the plurality of objects of interest to a source ranking system (e.g., source ranking system 240).

In block 440, the plurality of objects of interest are ranked to generate a plurality of ranks and a plurality of ranked objects of interest using a source ranking system (e.g., source ranking system 240). The source ranking system may receive objects of interest from the source contextual image segmenter. The source ranking system may send the plurality of ranks and the plurality of ranked objects of interest to a frame key generator (e.g., frame key generator 250). In one example, the plurality of ranked objects of interest may be generated from the plurality of objects of interest by a ranking algorithm. For example, the plurality of objects of interest may be ranked as they appear over different sessions or over time.

In block 450, a plurality of frame keys corresponding to the objects of interest is generated using a frame key generator (e.g., frame key generator 250). In one example, each of the plurality of frame keys corresponds to one of the objects of interest. In one example, the frame key generator accepts objects of interest or segmented image frames from the source contextual image segmenter (e.g., source contextual image segmenter 230). In one example, the frame key generator accepts the plurality of ranks and the plurality of ranked objects of interest from the source ranking system (e.g., source ranking system 240). In one example, the frame key generator accepts the audio signal from the microphone (e.g., microphone 220) to generate the plurality of frame keys from the segmented image frames. In another example, the frame key generator may support textual representation of the objects of interest for the plurality of frame keys.

In block 460, a source stored model data is retrieved from a storage system 270. For example, the source stored model data has been stored after a learning process. In one example, the learning process produces the source stored model data after a plurality of video transmission sessions. In one example, the source stored model data is an input to a source contextual video learning system (e.g., source contextual video learning system 260). In one example, the source stored model data has varying quality measures.

In one example, the learning process is a precursor to contextual video encoding. For example, a raw image frame may be segmented to generate an object matrix O with a type matrix T. In one example, a Euclidean distance matrix E which includes Euclidean distances between pairs of objects is computed by the ranking system. For example, the object matrix O are weighted by the ranking system to generate a ranked object matrix R. For example, the ranking system generates a rank-adjusted frame key matrix K by performing a matrix multiplication between the Euclidean distance matrix E and the ranked object matrix R, that is, $K=E*R$, where * denotes matrix multiplication.

In one example, the learning process accepts the type matrix T, the rank-adjusted frame key matrix K and the set of raw image frames to learn how to recall ranked objects using the rank-adjusted frame key matrix K. In one example, the learning system uses a neural network, for example, a graph neural network to learn how to recall ranked objects using the rank-adjusted frame key matrix K.

In block 470, a training metric is generated using a source contextual video learning system (e.g., source contextual video learning system 260) with the plurality of frame keys and the source stored model data. For example, the source contextual video learning system is a neural network. In one example, the training metric is determined using an error metric. For example, the error metric is a minimal output error. In one example, the training metric is based on source stored model data produced by a learning process. For example, the training metric is a neural network error metric.

For example, a retrieval process is used for contextual video encoding and decoding after the learning process is completed. For example, for each raw image frame acquired from a camera, an input rank-adjusted frame key matrix I is derived as an input training metric and presented to a contextual learning system to recall an object to generate a recalled object. Next, a difference between the recalled object and original object may be computed. For example, the retrieval process may compute a training metric as a recall rank-adjusted frame key matrix C from the recalled object. For example, a matrix distance D may be computed as a difference between the training metric and the input training metric. For example, the matrix distance D may be computed as a difference between the recall rank-adjusted frame key matrix C and the input rank-adjusted frame key matrix I, that is D=C−I.

In block 480, the training metric is tested by comparing the training metric to a metric based on the sequence of raw image frames. In one example, a loss metric test block (e.g., loss metric test block 280) compares the training metric to a metric based on the sequence of raw image frames. For example, the loss metric test block measures a loss of object features (e.g., shape, color, dimensions, etc.). In one example, establish a loss threshold L for a loss metric test. For example, compare the matrix distance D to the loss threshold L. If the matrix distance D is less than the loss threshold L, then the loss metric test passes. If the matrix distance D is greater than or equal to the loss threshold L, then the loss metric test fails. In one example, if the matrix distance D is zero, then the recalled object is the same as the original object and there is no loss.

In block 490, the plurality of frame keys is transported to a destination over a communication path if the training metric passes a loss metric test, or a sequence of encoded image frames is transported over the communication path if the training metric fails the loss metric test. For example, the sequence of encoded image frames is generated by a video encoder from the sequence of raw image frames. In one example, the video encoder is a non-contextual video encoder. In one example, the video encoder complies with a commercially-available encoding standard such as MPEG-2, H.264, VP9, etc.

Figure 5:
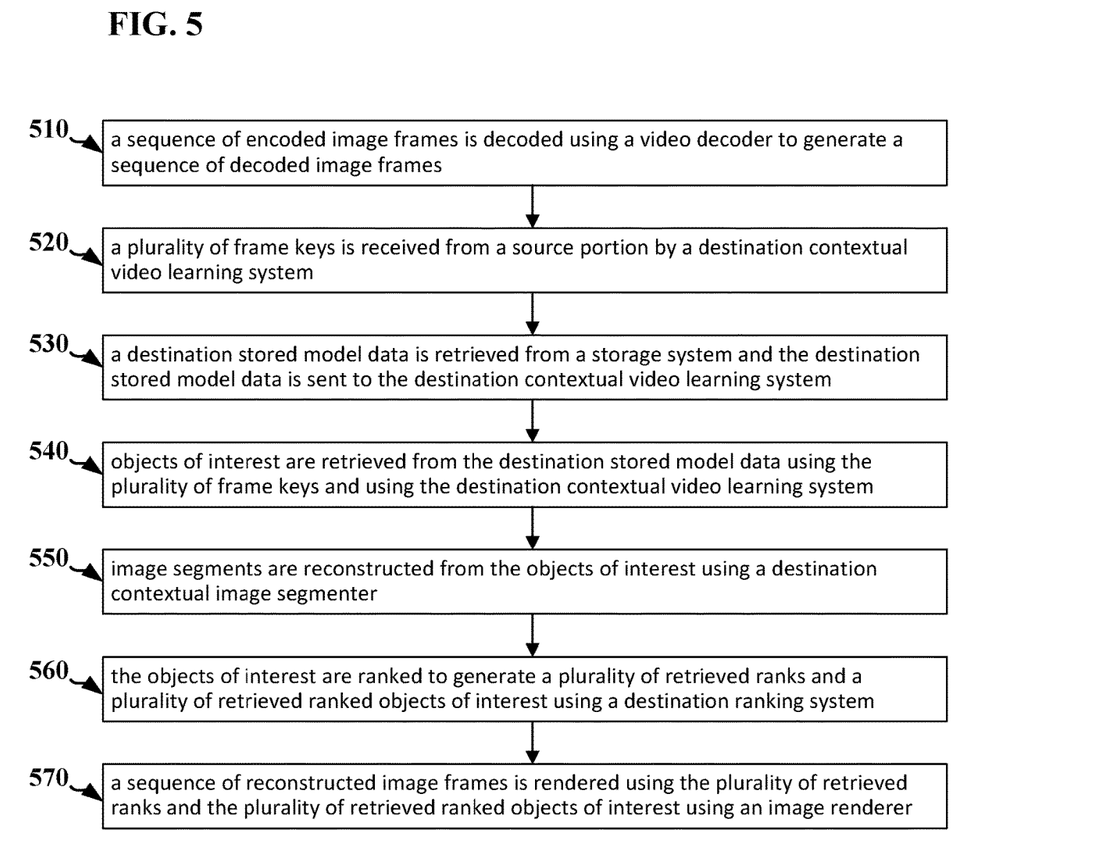
FIG. 5 illustrates an example flow diagram for a video decoding system using contextual video learning at a destination portion.

FIG. 5 illustrates an example flow diagram 500 for a video decoding system using contextual video learning at a destination portion.

In block 510, a sequence of encoded image frames is decoded using a video decoder (e.g., video decoder 360) to generate a sequence of decoded image frames. In one example, the video decoder is a non-contextual video decoder. In one example, the video decoder complies with a commercially-available decoding standard such as MPEG-2, H.264, VP9, etc. In one example, the video decoder receives the sequence of encoded image frames over a communication path if a training metric fails a loss metric test at a source portion.

In block 520, a plurality of frame keys is received from a source portion by a destination contextual video learning system (e.g., destination contextual video learning system 320).

In block 530, a destination stored model data 310 is retrieved from a storage system and the destination stored model data is sent to the destination contextual video learning system (e.g., destination contextual video learning system 320). In one example, the destination stored model data in the destination portion is identical to the source stored model data in the source portion.

In block 540, objects of interest are retrieved from the destination stored model data using the plurality of frame keys and using the destination contextual video learning system (e.g., the destination contextual video learning system 320).

In block 550, image segments are reconstructed from the objects of interest using a destination contextual image segmenter (e.g., destination contextual image segmenter 330). In one example, the objects of interest in block 550 are the objects of interest retrieved in block 540.

In block 560, the objects of interest are ranked to generate a plurality of retrieved ranks and a plurality of retrieved ranked objects of interest using a destination ranking system (e.g., destination ranking system 340). The destination ranking system may send the plurality of retrieved ranks and the plurality of retrieved ranked objects of interest to an image renderer (e.g., image renderer 350).

In block 570, a sequence of reconstructed image frames is rendered using the plurality of retrieved ranks and the plurality of retrieved ranked objects of interest using an image renderer (e.g., image renderer 350). In one example, the image renderer 350 generates a sequence of recovered image frames from the sequence of decoded image frames from the video decoder 360. In one example, rendering includes synthesizing an image using constituent parts, for example, objects of interest. For example, rendering may perform various image processing tasks such as texturing, lighting, shading, ray tracing, etc. One skilled in the art would understand that the various examples relating to rendering disclosed herein are not exclusive and that other examples are within the scope and spirit of the present disclosure.

In one aspect, one or more of the steps disclosed in FIG. 4 and FIG. 5 may be executed by one or more processors which may include hardware, software, firmware, etc. In one aspect, one or more of the steps in FIG. 4 and FIG. 5 may be executed by one or more processors which may include hardware, software, firmware, etc. The one or more processors, for example, may be used to execute software or firmware needed to perform the steps in the flow diagrams of FIG. 4 and FIG. 5. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware to execute one or more of the steps disclosed in FIG. 4 and FIG. 5. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for video encoding, the method comprising:
   segmenting each frame of a sequence of raw image frames to derive a plurality of objects of interest;
   ranking the plurality of objects of interest to generate a plurality of ranks and a plurality of ranked objects of interest;
   generating a rank-adjusted frame key matrix K corresponding to the plurality of objects of interest, wherein the rank-adjusted frame key matrix K is generated by performing a matrix multiplication between a Euclidean distance matrix E and a rank object matrix R wherein K=E*R, with * denoting matrix multiplication;
   retrieving a source stored model data; and
   generating a training metric using the rank-adjusted frame key matrix K and the source stored model data.

2. The method of claim 1, further comprising testing the training metric by comparing the training metric to a metric based on the sequence of raw image frames.

3. The method of claim 2 further comprising transporting the plurality of frame keys over a communication path if the training metric passes a loss metric test.

4. The method of claim 2 further comprising transporting a sequence of encoded image frames over the communication path if the training metric fails the loss metric test.

5. The method of claim 3, further comprising acquiring the sequence of raw image frames.

6. The method of claim 5, wherein a camera is configured to acquire the sequence of raw image frames.

7. The method of claim 6, further comprising acquiring an audio signal associated with the sequence of raw image frames.

8. The method of claim 7, wherein a microphone is configured to acquire the audio signal.

9. The method of claim 4 further comprising generating the sequence of encoded image frames from the sequence of raw image frames.

10. A method for video decoding, the method comprising:
receiving a rank-adjusted frame key matrix K from a source portion by a destination contextual video learning system, wherein the rank-adjusted frame key matrix K is generated by performing a matrix multiplication between a Euclidean distance matrix E and a rank object matrix R wherein K=E*R, with * denoting matrix multiplication;
retrieving a destination stored model data from a storage system and sending the destination stored model data to the destination contextual video learning system; and
retrieving a plurality of objects of interest from the destination stored model data using the rank-adjusted frame key matrix K and using the destination contextual video learning system.

11. The method of claim 10, further comprising reconstructing a plurality of image segments from the plurality of objects of interest using a destination contextual image segmenter.

12. The method of claim 11, further comprising ranking the plurality of objects of interest to generate a plurality of retrieved ranks and a plurality of retrieved ranked objects of interest using a destination ranking system.

13. The method of claim 12, further comprising rendering a sequence of reconstructed image frames using the plurality of retrieved ranks and the plurality of retrieved ranked objects of interest.

14. The method of claim 13, wherein an image renderer is configured to render the sequence of reconstructed image frames.

15. The method of claim 10, further comprising decoding a sequence of encoded image frames to generate a sequence of decoded image frames.

16. An apparatus for video encoding, the apparatus comprising:
a source contextual image segmenter configured to segment each frame of a sequence of raw image frames to derive a plurality of objects of interest;
a source ranking system coupled to the source contextual image segmenter, the source ranking system configured to rank the plurality of objects of interest to generate a plurality of ranks and a plurality of ranked objects of interest;
a frame key generator coupled to the source contextual image segmenter, the frame key generator configured to generate a rank-adjusted frame key matrix K corresponding to the plurality of objects of interest, wherein the rank-adjusted frame key matrix K is generated by performing a matrix multiplication between a Euclidean distance matrix E and a rank object matrix R wherein K=E*R, with * denoting matrix multiplication;
a processor coupled to the frame key generator, the processor configured to recall a source stored model data; and
a source contextual video learning system coupled to the frame key generator, the source contextual video learning system configured to generate a training metric using the rank-adjusted frame key matrix K and the source stored model data.

17. The apparatus of claim 16, further comprising a memory coupled to the source contextual video learning system, the memory configured to store the source stored model data.

18. An apparatus for video decoding, the apparatus comprising:
a destination contextual video learning system configured to receive a rank-adjusted frame key matrix K from a source portion, and configured to use the rank-adjusted frame key matrix K to recall a destination stored model data, wherein the rank-adjusted frame key matrix K is generated by performing a matrix multiplication between a Euclidean distance matrix E and a rank object matrix R wherein K=E*R, with * denoting matrix multiplication; and
a storage system coupled to the destination contextual video learning system, the storage system configured to store the destination stored model data and to send the destination stored model data to the destination contextual video learning system; and
wherein the destination contextual video learning system is configured to retrieve a plurality of objects of interest from the destination stored model data using the rank-adjusted frame key matrix K.

* * * * *